United States Patent

[11] 3,619,572

[72] Inventor Jean-Pierre Murat
Argenteuil, France
[21] Appl. No. 880,688
[22] Filed Nov. 28, 1969
[45] Patented Nov. 9, 1971
[73] Assignee Societe D'Applications Generals D'Electricite Et De Mecanique
Paris, France
[32] Priority Nov. 29, 1968
[33] France
[31] 175,882

[54] PUNCHED TAPE READER UNIT
3 Claims, 10 Drawing Figs.

[52] U.S. Cl. .......... 235/61.11 C, 197/98, 178/17 A, 335/154
[51] Int. Cl. .......... G06k 7/08
[50] Field of Search .......... 235/61.113, 61.114, 61.11, 61.112, 61.111, 61.12; 178/17 A, 17 B, 23.1, 17.5; 335/205, 152, 153, 154; 200/46; 197/98

[56] References Cited

UNITED STATES PATENTS 3,430,226 2/1969 Chow et al. .......... 197/98
3,446,944 5/1969 Soper .......... 235/61.12

*Primary Examiner*—Thomas A. Robinson
*Attorney*—Abraham A. Saffitz

ABSTRACT: Reader unit for reading holes punched in a tape along rows transverse thereto comprising means for selectively advancing step-by-step in forward or backward directions, a group of readout levers terminated at their first ends by feelers of the punched holes of the tape, magnetic shield caps carried by the second ends of the readout levers, a group of reed switches each associated with a readout lever, a permanent magnetic field producing means for activating said reed switches and means for selectively positioning said readout levers and magnetic shield caps which they carry responsively to the punched holes of the tape in a first position in which the feelers pass through the holes and the caps shield the reed switches from the permanent magnetic field and a second position in which the feelers contact the tape and the caps do not shield the reed switches. The group of readout levers is divided into two subgroups respectively reading two words written in two successive rows of the tape. One word is stored and the word actually readout is compared to the stored word in a comparator. The comparator controls the direction of the advancing means.

INVENTOR:
Jean-Pierre MURAT
By Abraham A. Saffitz
ATTORNEY

INVENTOR:
Jean-Pierre MURAT
By Abraham A. Saffitz
ATTORNEY

INVENTOR:
Jean-Pierre MURAT
By Abraham A. Saffitz
ATTORNEY

INVENTOR:
Jean-Pierre MURAT
By Abraham A. Saffitz
ATTORNEY

INVENTOR:
Jean-Pierre MURAT
By Abraham A. Saffitz
ATTORNEY

PUNCHED TAPE READER UNIT

The present invention relates to a unit for reading punched tapes or cards having tracks carrying transverse rows of punched holes at a constant interval or step and more particularly, a unit comprising (a) a reading device for the tape, (b) a device for coding in groups of electrical signals the successive punched characters, (c) an inversion device controlling the direction of progression of the tape, (d) a progression device for the tape, all arranged in such a manner that at each rotation or cycle of a single driving shaft and under the control of electrical impulses acting at the start of each cycle on electromagnets, each punched character of the tape is read out and coded and the tape advances by one step in the assigned direction. Herein a reader unit of this type will be referred to as a reader unit of the type aforesaid.

Reader units of the type aforesaid using as coding elements reed switches are known in the prior art but in them coding is effected by shifting the switches with respect to magnets which is a comparatively complicated solution.

According to the principal feature of the invention the reader unit comprises readout levers each terminated at one end by a feeler of the punched holes of a tape and carrying at the other end a substantially cylindrical magnetic shield cap, reed switches, an electromagnet for activating said reed switches, and means for selectively positioning said readout levers and associated magnetic shield caps in a first position in which the feelers pass through the holes and the caps shield the reed switches from the electromagnet and in a second position in which the feelers contact the tape and the caps do not shield the reed switches.

The readout levers take an operative position whether a punched hole at the points of the tape scanned by the levers is present or absent. This is contrary to generally accepted systems in which the feeler levers or equivalent elements remain in their position of rest in the absence of holes and has the advantage of increased reliability of function when the reader unit is in surroundings subject to vibrations or shocks, in a moving car for example.

The reader unit is adapted for data transmission systems in which the same character is read out several times, say two times, and the character signals are transmitted only when the two readout signals representing the same character are identical. When the character signal read out the second time does not coincide with the character signal readout the first time, the tape is allowed to make a back step. In these systems the direction of progression of the tape is controlled by a character comparator.

According to another feature of the invention, the reader unit comprises two sets of readout levers adapted to read out two successive punched hole characters on a tape, which allows the use of the reader unit in connection with a character code comparator which permits the transmission of a character only when it has been read out identically two times.

According to another feature of the invention, an inverter device of the direction of progression of the tape is provided and is controlled by the character code comparator. This inverter device operates during the readout cycle of the actual character and no time is lost in changing the direction of progression of the tape.

The present invention will now be described by way of example with reference to the accompanying drawings, in which.

Figure 1:
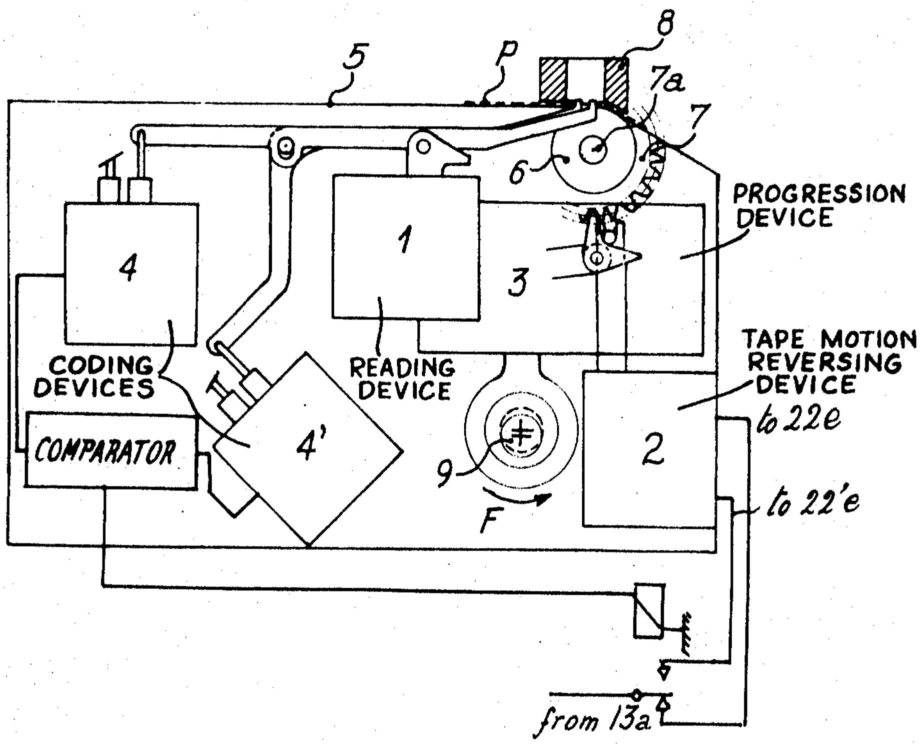
FIG. 1 is a schematic diagram of the reader unit.

Reference will be made first of all to FIG. 1 which shows diagrammatically and partly in the form of a block diagram essential members of a punched tape reader assembly, namely, a reading device 1 for the tape, a tape motion reversing device 2 to determine in which direction the tape will be moved, a progression device 3 for the tape, two coding devices 4, 4′ for information carried by the tape.

FIG. 1 also shows a punched tape P while it is being read. The tape is driven step-by-step on a plate 5, by a sprocket wheel 6, keyed on a shaft 7*a* as is a toothed driving wheel 7. The tape is passed for reading under a tape press 8, which is a substantially rectangular frame. The apparatus is moved mechanically by a single driving shaft 9 permanently rotating in a direction indicated by an arrow F.

A reading device 1 (see FIG. 2) comprises, keyed on the shaft 9 a first eccentric 11, a cam 12 and a collar carrying a magnetic finger 13. The magnetic finger 13 cooperates with a magnetic contact stud 13*a* to allow closure of a feed circuit of an electromagnet 14*e* fixed to the frame. Stud 13*a* is shiftable and has two positions, one in which it is acted upon by the finger 13 and acts as a pulse generator and the second in which it remains inoperative. The electromagnet 14*e* is provided with an armature 14, mounted so as to pivot about a spindle 14*a* and urged from the electromagnet by a traction spring 14*b* hooked to the frame. The blade 14 has at its free end a notch 14*c* which has a function to be explained subsequently.

A retractable stop 15 in the general shape of a flat bar bent in a "V" has on the left-hand arm of the "V" (seen in FIG. 2) an intermediate heel or folded tab 15*c*, and, at a free end of that arm, a notch 15*d*. There is at a free end of the other arm of the "V", a loose roller 15*e* capable of cooperating with the aforesaid cam 12. The retractable stop 15 is mounted to pivot about an axis 15*a* and is urged from the blade 14 by a spring 15*b* hooked to the frame. The notch 15*d* is capable of acting as will be seen later on, on a shoulder 15*f* of a fixed stop fixed to the frame.

Figure 2:
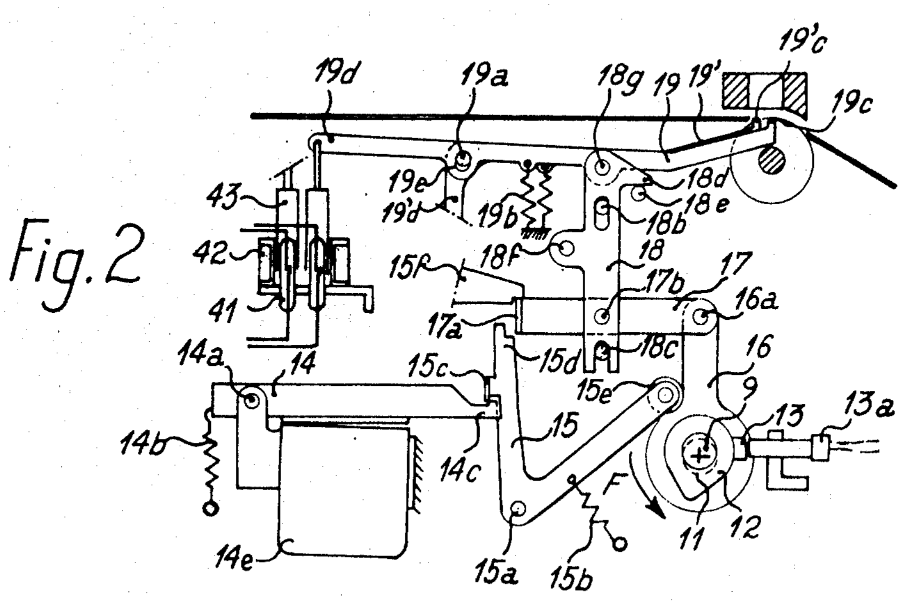
FIG. 2 is a diagram of the reading device of the reader unit of FIG. 1 in its position of rest where a reading cycle is starting.

A connecting rod 16 has a head which is mounted on the aforesaid eccentric 11, and a foot 16*a* articulated (as seen in FIG. 2) to a flat rocker arm 17. The rocker arm 17 has, at its other end, a flanged edge forming a heel 17*a* and is pivoted at an intermediate point 17*b* on a flat slide 18. The slide 18 is guided thanks to oblong holes by two posts 18*b*, 18*c* fixed to the frame, so as to be able to rise into an upper or working position and drop down again to a lower or rest position, in a vertical direction in its plane. It has an upper lateral nose 18*d* capable of cooperating with a fixed stop 18*e* attached to the frame and an intermediate bulge with finger 18*f*. Slide 18 is pivotally connected to a series of flat reading levers 19, 19′ through pivot 18*g* at the upper end of the slide 18. Each reading lever, for example 19, comprises at its right-hand end (see FIG. 2) a nose set up vertically or feeler 19*c* and at its left-hand end a tail or shank 19*d* which will be referred to again later on. The bell crank lever 19 is mounted to pivot about a spindle 19*a* which is attached to the frame, by means of a lower intermediate ear with an oblong hole 19*e* disposed to the left of the aforesaid articulation 18*g*. Finally, the lever 19 is urged to the rest position of the slide 18 by a traction spring 19*b* hooked to the frame.

Feelers 19c, 19'c of each pair of levers 19, 19' are arranged in line along the tape (one of them being provided with a horizontal crosshead) and spaced apart so as to read on the tape binary digits of two consecutive characters, that is to say of two consecutive transverse rows of the tape. Assuming for instance that the tape has eight binary digits per character, therefore per transverse row, there are provided eight pairs of reading levers 19, 19'.

The coding devices 4, 4' are practically identical and each constituted, for example 4, by eight magnetic reed switches 41 mounted under a glass bulb in a protective atmosphere. Switches 41 are mounted in a permanent magnetic field generated by a coil 42 and are arranged in alternate rows in order for each switch to be associated with a single lever despite the switches being bulkier than the lever spacing. The magnetic switches 41 are individually capped with magnetic shield casings 43, each articulated on the shank 19d of an associated reading lever 19. Each casing such as 43 is mounted so that when lever 19 is at rest contact 41 is open. Associated with each pair of reading levers 19, 19' there are, therefore, two assemblies 41–43, 41'–43' mounted in coils 42, 42' of the coding devices 4, 4' respectively.

The inversion device 2 (see FIG. 3) comprises, keyed on shaft 9, a second eccentric 21. Two electromagnets 22e, 22'e fixed to the frame have in common an armature 22 mounted pivotally about a pivot 22a and capable of assuming two positions, at a slight angular distance one from the other, according to the electromagnet by which it is attracted. These electromagnets are connected to pulse generator 13a by an inversion switch not represented and controlled by a code comparator not shown. Code comparators which store the bits of a character received at two different instants and produce a comparison signal according as to whether the two characters successively received are the same are known in the prior art.

A flat connecting rod 23 has an intermediate extension with notch 23a, into which there engages permanently the free end of the aforesaid armature 22. The connecting rod 23 is articulated, at a point situated not far from its lower end, by a spindle 23b at an intermediate point of a flat arm 24; it is articulated at its upper end by a spindle 23c, at an intermediate point of a flat arm 24'. The connecting rod 23 has at its lower end a lateral triangular point 23d. Point 23d has a function which will now be specified. A first bolt 231, constituted by a flat bar, carries at its upper end a finger 231c which cooperates with the lower aforesaid point 23d of the connecting rod 23. The bolt 231 is mounted pivotally by its lower end about a pin 231a connected to the frame; it is urged to rotate in the direction of the mutual support of the two collaborating elements 23d, 231c, by means of a traction spring 231b hooked to the frame. It is now clear that depending on where the blade 22 is located the connecting rod 23 can assume an upper position or a lower position which are both locked by the bolt 231.

The two arms 24, 24' are identical and in substantially symmetrical positions with regard to the blade 22. Each of these arms, for example 24, is mounted pivotally about a spindle 24a fixed to the frame and has laterally, near its left-hand end, on that side which is turned towards the other arm, a notch 24b. The two notches 24b, 24'b are capable of collaborating with the tongues 25b, 25'b of a flat fork 25. The fork 25, in the shape of a very open "V," is mounted pivotally by the summit of the "V" about a pin 25a mounted at the end of a first leg of a flat lever 26. The lever 26, bent at a right angle, is mounted pivotally about a pin 26a fixed to the frame and is articulated by the end of its second leg to the foot 27a of a connecting rod 27, the head of which is mounted on the aforesaid eccentric 21.

The tongues 25b, 25'b of the fork 25 are also capable of cooperating with a flat lever 28. The lever 28 is mounted pivotally about a pin 28a fixed to the frame; its upper end is cut out axially to form a fork 28b having two parallel prongs and its lower end has a triangular point 28c, the role of which will now be specified. A second bolt 281, constituted by a flat bar, carries at its right-hand end a finger 281c which collaborates with the aforesaid point 28c of the lever 28. The bolt 281 is mounted pivotally by its left-hand end about pin 281a fixed to the frame; it is urged to rotate in the direction to mutual support of the two collaborating elements 28c, 281c, by means of a traction spring 281b hooked to the frame. It is now clear that, according to the position of the fork 25 the lever 28 can assume a first or second position, symmetrical with regard to the vertical, in either of which it is locked by the bolt 281.

The fork 28b of the lever 28 cooperates with an end finger 29b of a small bar 29, which is mounted pivotally about a spindle 29a connected to the frame and situated plumb with and below the axis 7a of the aforesaid toothed wheel 7.

Figure 4:
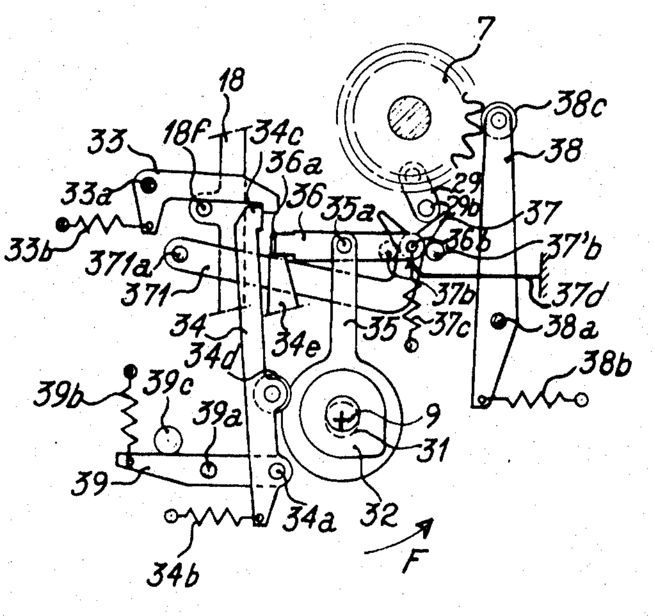
FIG. 4 is a diagram of a progression device of the tape in its rest position where the progression cycle of the tape is starting and shows an advance fork resting on its seat.

The progression device 3 (see FIG. 4) comprises, keyed on the shaft 9, a third eccentric 31 and a cam 32.

A pawl 33 is mounted pivotally about a pin 33a fixed to the frame; it is acted on about halfway along its lower edge by the finger 18f of the aforesaid slide 18 and it is urged to remain in contact with this finger by a traction spring 33b hooked to the frame.

A retractable stop 34, in the general form of a flat bar, has an upper nose 34c having a double shoulder which cooperates with the aforesaid pawl 33 and which constitutes, strictly speaking, the retractable stop, as well as an intermediate bulge with loose roller 34d, which cooperates with the aforesaid cam 32. The retractable stop 34 is mounted pivotally about a pin 34a at one end of a safety lever 39 to be described later on. The stop 34 is, on the other hand, urged by a spring 34b which tends to make the stop escape from the pawl 33. The lower shoulder of the nose 34c is capable of collaborating, as will be seen later on, with a fixed stop 34e connected to the frame.

A connecting rod 35 has a head which is mounted on the aforesaid eccentric 31, and a foot 35a articulated at an intermediate point of a flat lever 36. The lever 36 has at its left-hand end a flanged edge forming a heel 36a and it is articulated at its right-hand end about a spindle 36b both on to a fork 37 and one end of a flat arm called an accompanying arm 371, which is mounted pivotally by its other end about a pin 371a fixed to the frame.

The fork 37 in the shape of a "V" cooperates with a finger 29b of the aforesaid small bar 29 to make sprocket wheel 7 progress by one step at a time, in one direction or another according to what position bar 29 is put by the device 2. Motion of the spindle 36b of the fork 37 is circular as determined by the accompanying lever 371 and its travel is limited to its lower position or position of rest by two posts 37b, 37'b forming a seat. The fork 37 is urged towards its lower position or position of rest by a traction spring 37c hooked to the frame. Return to its rest position is braked by a blade spring 37d, connected to the frame and which serves as a damping element.

A flat positioning lever 38 carrying at its upper end a loose roller 38c cooperating with the toothed wheel 7, is mounted pivotally about a pin 38a fixed to the frame and urged towards the support of the said roller against the said toothed wheel by a traction spring 38b hooked to the frame. A flat safety lever 39, carrying at its right-hand end the articulation pin 34a of the retractable stop 34, is mounted pivotally about a pin 39a fixed to the frame and urged towards a support on a fixed stop 39c fixed to the frame by a traction spring 39b hooked to the frame.

Figure 5:
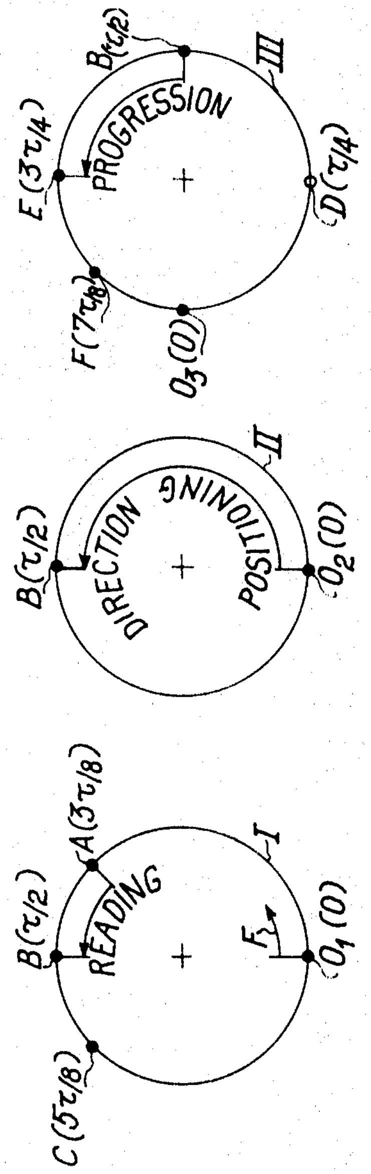
FIG. 5 is a diagram of cycles of the three devices for reading-out, inversion and progression, intended to show the interlaced functions of the three devices.

The reader unit thus described functions as follows. In order to describe it, use will be made of the diagram of FIG. 5 which shows schematically an operation cycle of the three devices for reading 1, inversion 2 and progression 3, by representing circular trajectories I, II, III of geometrical centers of eccentrics 11, 21, 31 respectively, for one revolution of the shaft 9. $O_1$, $O_2$, $O_3$ designate the positions of the eccentric centers at the initial instant of the cycle.

It is assumed that the punched tape or card P has been previously placed on the plate 5 (see FIG. 1) so that a punched character is in a reading position and a reading order is given manually or automatically to the apparatus.

Figure 2A:
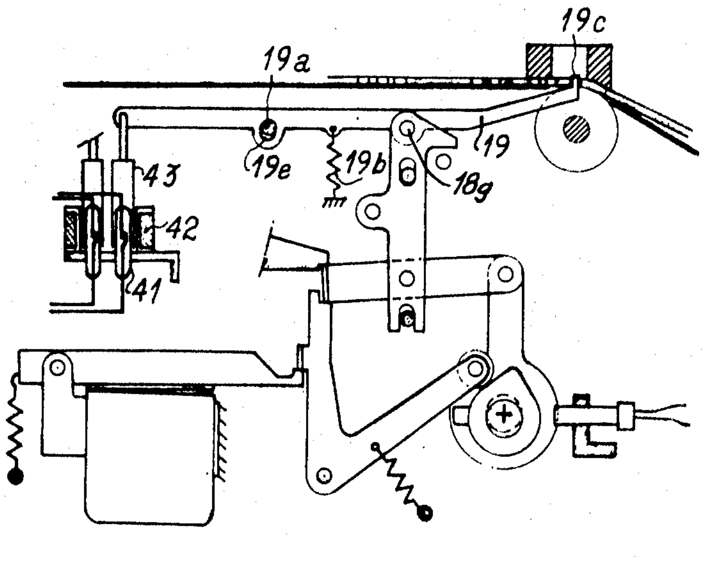
FIG. 2A is a diagram similar to that of FIG. 2 showing the reading device in a first working position in which a readout lever feeler is reading a punched hole.
Figure 2B:
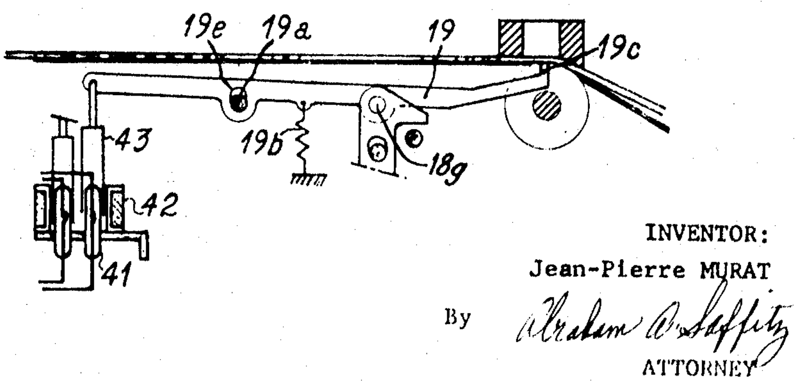
FIG. 2B is a diagram similar to that of FIG. 2A showing the reading device in a second position in which a readout lever feeler is reading a nonpunched tape or card.

At an initial instant of the cycle, the center of eccentric 11 being at $O_1$ at its lower position (see FIG. 2) the magnetic contact 13–13$a$ allows an impulse to be sent to the electromagnet 14$e$. The result of this is that the retractable stop 15 releases, the heel 17$a$ of the lever 17 is then framed between the shoulders 15$d$ and 15$f$ of the retractable stop and the fixed stop respectively. The heel 17$a$ is thus in a position to pivot when the eccentric is going up and in doing so raises the slide 18 and the reading levers 19, 19′ or, more precisely, the points such as 18$g$ of these levers (see FIG. 2A and 2B). Reading proper is effected on the arc AB of the diagram I of FIG. 5. When eccentric 11 returns to its initial position, about an eighth of a revolution later at C, the cam 12 raises upon its passage the roller 15$e$ of the retractable stop, which has the effect of resetting it, while all the other elements of the device 1 revert to their initial positions.

When a reading arm such as 19 is being raised two cases can happen. If the feeler 19$c$ finds a punched hole (see FIG. 2A), the lever 19 pivots about the pin 19$a$ in a anticlockwise direction (FIG. 2A) and causes the associated cap 43 to lower, so that the corresponding magnetic switch 41 remains open. If the feeler 19$c$ does not find a punched hole (see FIG. 2B), the lever 19, contacting the tape, pivots in the clockwise direction (FIG. 2B) about pivot 18$g$, the pin 19$a$ shifting in the oblong hole 19$e$, and causes the magnetic cap 43 to rise, so that the magnetic switch 41 exposed to the magnetic field of the coil 42 closes momentarily.

Figure 3:
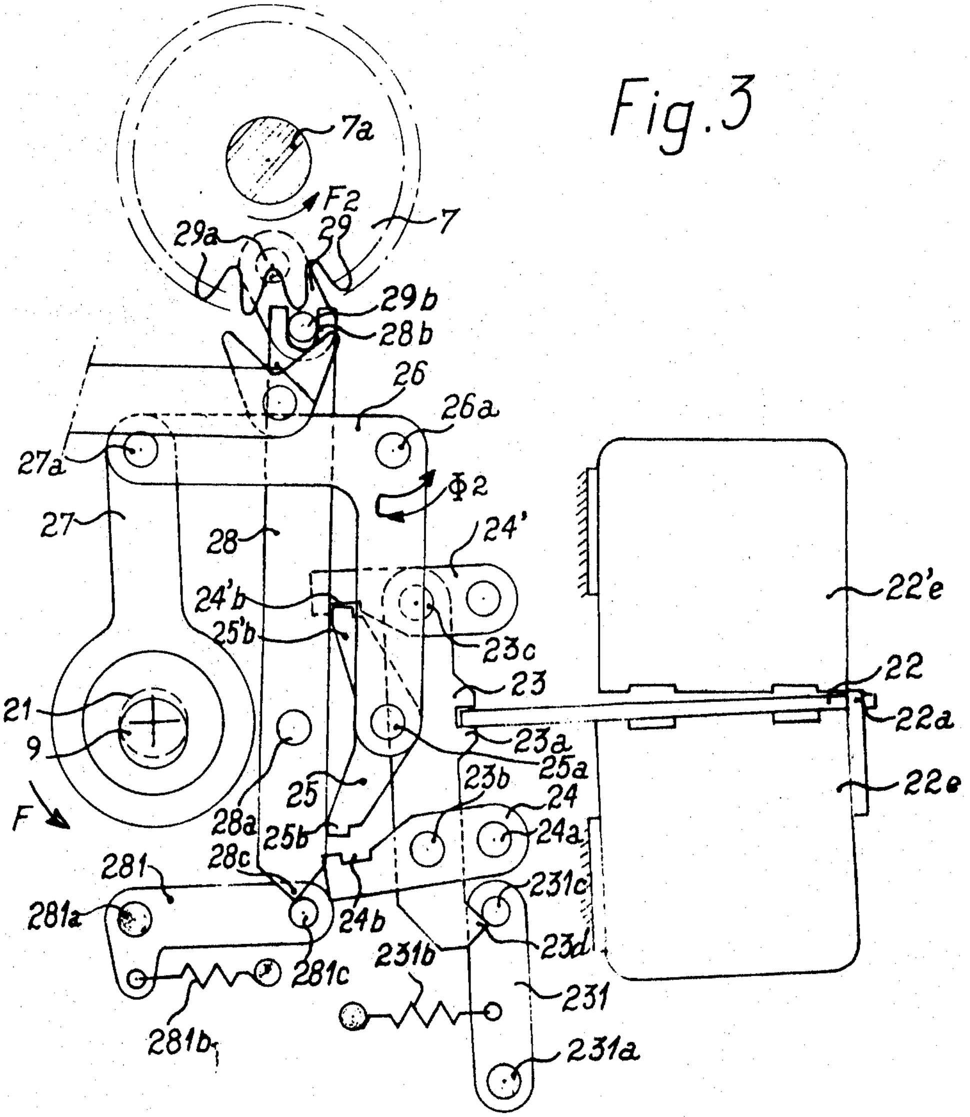
FIG. 3 is a diagram of the inversion device of the reader unit of FIG. 1 in which an inversion finger has been brought into its progression position in a first direction.

At the initial instant of the cycle, the center of eccentric 21 being at $0_2$ at its lower position, at the same time that an impulse is sent to the electromagnet another impulse is sent to one of the electromagnets 22$e$, 22′$e$. Two cases are to be considered. If the excited electromagnet is 22$e$ (as shown in FIG. 3), it attracts the blade 22. The result of this is that, because of the connecting rod 23, the nose 25′$b$ of the fork 25 engages the notch 24′$b$ of the arm 24′ and the nose 25$b$ of the said fork, 25 disengages from the notch 24$b$ of the arm 24, the said elements being locked by the first bolt 231. As eccentric 21 raises, the lever 26 rotates clockwise (first arrow $\Phi_2$), the free nose 25$b$ of the fork 25 causes the lever 28 also to pivot clockwise, this lever finally being locked by the second bolt 281. The result is finally that the inversion finger 29$b$ is brought to its right-hand position. The state of the device is then that shown in FIG. 3, preparing as will be seen later, the progression by one angular step of the toothed wheel 7 in a first direction (arrow F2). The desired positioning of the finger 29$b$ is then ensured after half a revolution of the cycle (arc $0_2$B of the diagram II of FIG. 5). As eccentric 21 is returning to its initial position, all the elements of the device 2 revert to their initial positions.

Figure 3A:
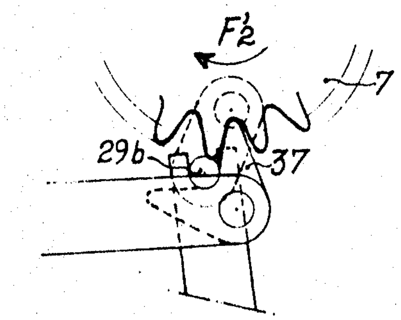
FIG. 3A is a diagram of the inversion device in which the inversion finger has been brought into its progression position in a direction opposed to the previous one.

It is clear that if the initial impulse had been sent to the electromagnet 22′$e$, the inversion finger 29$b$ would have been brought to its left-hand position (seen in FIG. 3A) so preparing the progression of the toothed wheel 7 in a direction opposed to the preceding one (arrow F′2). Whatever may be the final position acquired by the finger 29$b$, in the absence of an inversion order, the electromagnet concerned by the first operation can be excited at each cycle, at the same time as the reading electromagnet 14$e$, to confirm the direction adopted for the progression of the tape.

Figure 4A:
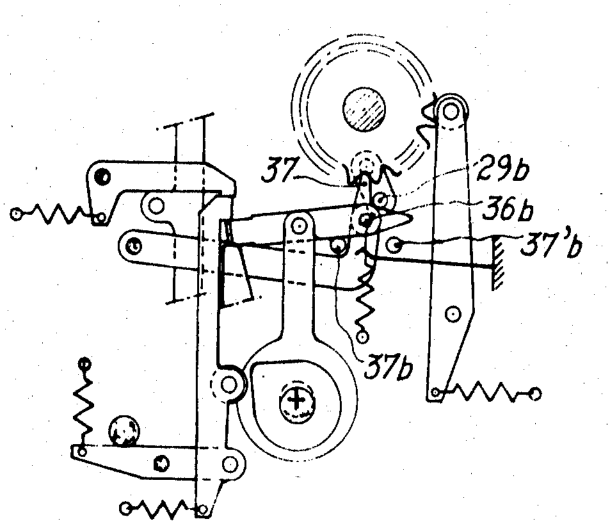
FIG. 4A is a diagram similar to that of FIG. 4, but with the progression device in a first working position, the advance fork being at its end of travel.

As slide 18 rises, after about a quarter of a cycle, the finger 18$f$ by raising the pawl 33 frees the retractable stop 34, so that the heel 36$a$ of the lever 36 then finds itself framed between a shoulder of the nose 34$c$ of the retractable stop and the fixed stop 34$e$. The eccentric 31 of the progression device 3 is then at its lower position corresponding to point D of diagram III of FIG. 5. The lever 36 is from then on in a position to pivot as eccentric 31 is going up and in doing so raises the fork 37 up to the position shown in FIG. 4A.

Figure 4B:
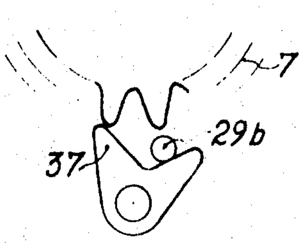
FIG. 4B is a detail diagram from FIG. 4A, and shows the progression fork in an intermediate position between those of FIGS. 4 and 4A.

The spindle 36$b$ of the fork 37 moves as already said about an arc of a circle of center 371$a$. Assuming that the inversion finger 29$b$ is in its right-hand position (seen in any of the Figures of the drawings) there is a succession of movements as follows. The fork 37, after having left its seat 37$b$, 37′$b$, abuts with its right-hand arm the finger 29$b$ (see FIG. 4B). As it continues to raise the fork pivots about its pin 36$b$ causing with its left-hand arm the toothed wheel 7 to rotate one tooth a distance in the direction of arrow F2 (FIG. 3), until it is at a position shown in FIG. 4A. Finger 29$b$ is then at the junction of the arms of fork 37. In this position, corresponding to the end of a full cycle of the progression, all elements of the progression device are positioned so that they are prevented from any accidental further movement by the inertia of the assembly comprising toothed wheel 7, shaft 7$a$, barbed wheel 6 and punched tape P. This progression by one step is regularized by the roller 38$c$ of the positioning lever 38. If undesirably the toothed wheel does not engage with the fork as it should, to allow the connecting rod 35 to continue its movement without causing damage, the safety lever 39 pivots slightly allowing the retractable stop 34 to be raised by the heel 36$a$ of the lever 36 until overloading is relieved. Progression of the tape is effected during the third quarter of the cycle (arc BE of diagram III of FIG. 5). Upon return of the eccentric 31 to its initial position, about one-eighth of a revolution later, at point F, the cam 32 raises the roller 34$d$ of the retractable stop, which has the effect of resetting it, while all other elements of the device 3 are returned to their initial positions. Near each of the points of the paths of the eccentric centers, there is indicated the fraction of the cycle $\tau$ at which these points are reached by said centers.

What I claim is:

1. Reader unit for reading holes punched in a tape along rows transverse thereto comprising means for selectively advancing step-by-step the tape in forward or backward directions, first and second pluralities of readout levers terminated at their ends by feelers of the punched holes of the tape, the feelers of the levers of the first plurality being spaced apart from the feelers of the levers of the second plurality by a distance equal to the interval between two successive transverse rows of the tape, magnetic shield caps carried by the second ends of the readout levers, first and second pluralities of reed switches each associated with a readout lever, a permanent magnetic field producing means for activating said reed switches, means for selectively positioning said readout levers and magnetic shield caps carried thereby responsively to the punched holes of the tape in a first position in which the feelers pass through the holes and the caps shield the reed switches from the permanent magnetic field and a second position in which the feelers contact the tape and the caps do not shield the reed switches, means for reading-out the states of the reed switches of the first plurality and deriving therefrom a first binary word, means for reading-out and storing the states of the reed switches of the second plurality and deriving therefrom a second binary word, means for comparing the first and second words and means controlled by said comparing means for selectively driving the tape advancing means.

2. Reader unit as set forth in claim 1 in which the means for selectively advancing step-by-step the tape in forward or backward directions comprises a ratchet wheel in engagement with the tape, a toothed wheel secured to said ratchet wheel, a shiftable finger having two selective positions, a first pivotable lever, a second V-shaped lever pivotably secured at the free end of said first lever and having two arms engaging with both said finger and toothed wheel teeth, means for imparting to said first lever a reciprocating movement and to said second lever a pivoting movement in which one of the lever arm abuts against the finger and the end of the other arm comes in engagement with and advances the toothed wheel and means for selectively shifting said finger from a first forward position to a second backward position.

3. Reader unit for reading holes punched in a tape along rows transverse thereto comprising means for selectively advancing step-by-step the tape in forward or backward directions, a plurality of readout levers having provided therein oblong holes substantially perpendicular to the lever length at a first point of said length and terminated at their first ends by feelers of the punched holes of the tape, connecting rods for driving said readout levers and connected thereto at a second point of their length, springs connected to said readout levers at a third point of their length intermediate between said first and second points, pivoting pins passing through said oblong holes and adapted for sliding therein whereby said readout levers can selectively take a first position in which the feelers pass through the punched holes and the pivoting pins are at one end of the oblong holes and a second position in which the feelers contact the tape and the pivoting pins are at the other end of the oblong holes, magnetic shield caps carried by the second ends of the readout levers, a plurality of reed switches each associated with a readout lever, a permanent magnetic field producing means for activating said reed switch and means for selectively positioning said readout levers and magnetic shield caps carried thereby responsively to the punched holes of the tape in the said first position in which the caps shield the reed switches from the permanent magnetic field and the said second position in which the caps do not shield the reed switches.

* * * * *